Feb. 16, 1965 M. D. FELT 3,169,776
MULTIPLE PURPOSE SELF-LOADING MACHINERY PACKING
Filed March 18, 1963 2 Sheets-Sheet 1
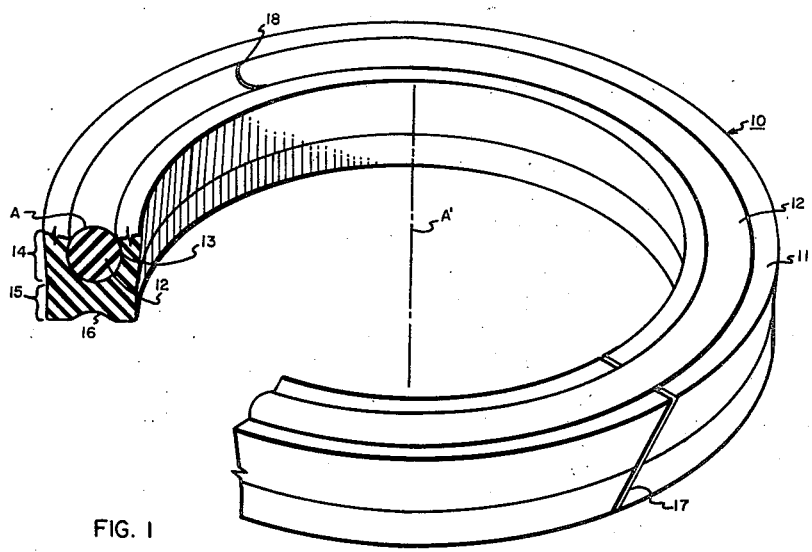
FIG. 1
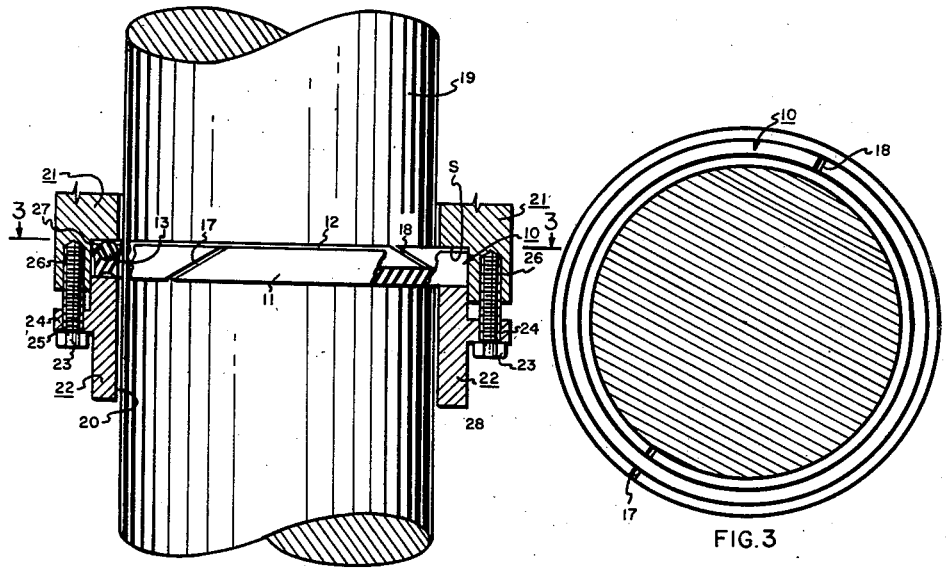
FIG. 2
FIG. 3
INVENTOR.
MAURICE D. FELT
BY M. Ralph Shaffer
HIS ATTORNEY

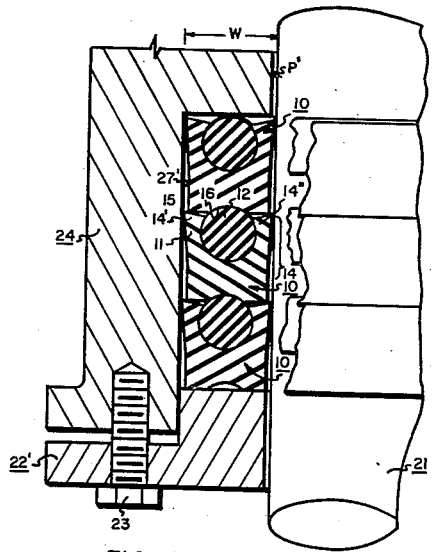
FIG. 4
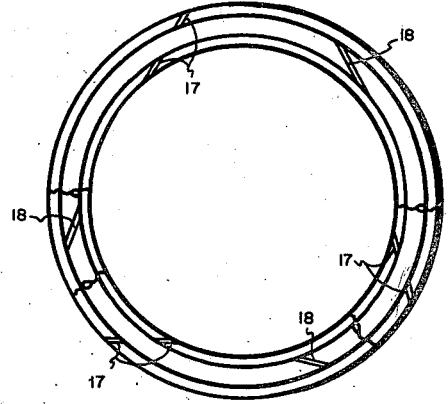
FIG. 5
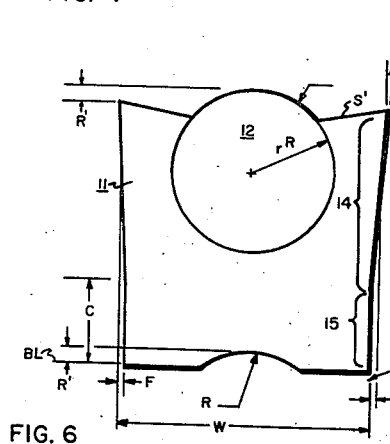
FIG. 6
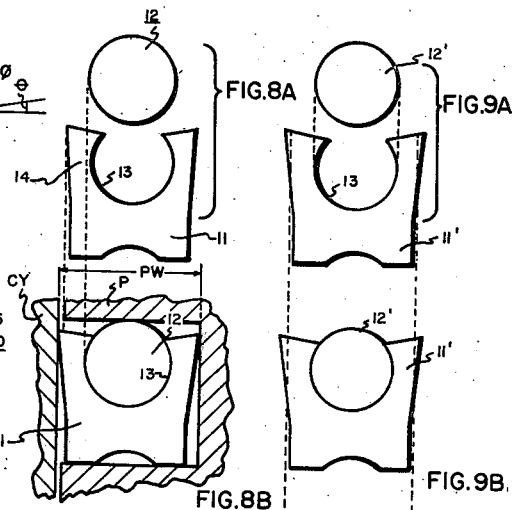
FIG.8A  FIG.9A
FIG.8B  FIG.9B
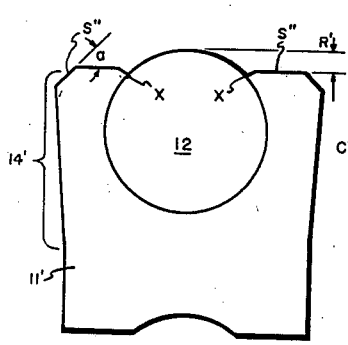
FIG. 7
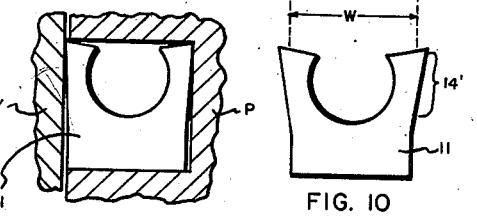
FIG. 11  FIG. 10
INVENTOR.
MAURICE D. FELT
HIS ATTORNEY

United States Patent Office 3,169,776
Patented Feb. 16, 1965

3,169,776
MULTIPLE PURPOSE SELF-LOADING
MACHINERY PACKING
Maurice D. Felt, Murray, Utah, assignor to Packing Supply Company, Salt Lake City, Utah, a corporation of Utah
Filed Mar. 18, 1963, Ser. No. 265,615
3 Claims. (Cl. 277—125)

The present invention relates to packing rings for machinery to effect sealing and, more particularly, to a new and improved packing ring structure which can be used in U-cup and V-packing contexts to great advantage both in sealing performance qualities obtained and in reduction in manufacturing cost.

The present packing ring is primarily intended for use in packing rings, piston rings, and gland structures in industrial equipment such as pumps and compressors, and offers ideal seals against high pressure and low pressure fluids, both liquids and gases, for reciprocating rods, pistons, valves, and other applications. The design advantages of the present packing ring construction are as follows: when used in sets to take the place of standard V-packings there is eliminated a need for positive and negative (male and female) adapters; fewer rings are required for comparable sealing of the gland or piston; O-rings thereof snap into the upper channel of the packing ring and provide in themselves seats for the next respective rings, and also expand the lips of the packing to provide seals for both low and high pressure operation; O-ring use therein provides a seal at a packing joint in the event the packing must be split for installation; and O-ring use can be employed to effect a pre-loading of each packing ring set and thus eliminate any need for gland pressure through structural take-up to obtain sealing between adjacent surfaces. Further, the components of the packing ring of the present invention can be used without the O-ring to take the place of a standard U-cup, and yet provide equal or higher sealing qualities than when compared with presently used U-cups.

Accordingly, an object of the present invention is to provide a new and improved packing ring structure for effecting sealing in industrial equipment such as pumps, compressors, and so forth, for sealing against liquids and gases in both low and high pressure contexts.

A further object of the invention is to provide "spring-loading," in effect, in the packing construction such that external structure need not be used to tighten down the packing and secure the seal, if it is not desirable to do so.

A further object of the invention is to provide a packing component which can be used in V-packing contexts and also as a U-cup, where desirable.

A further object of the invention is to provide a suitable packing ring-member which can be used either as a U-cup or as an element in a composite packing ring construction comprising several rings, wherein the seating of a respective O-ring in each packing ring-member provides a seat for the packing ring thereabove.

The features of the present invention which are believed to be novel are set forth with particularity in the appended claims. The present invention, both as to its organization and manner of operation, together with further objects and advantages thereof, may best be understood by reference to the following description taken in connection with the accompanying drawings in which:

FIGURE 1 is an enlarged perspective view, partially cut away for purposes of illustration, of a packing ring constructed according to one embodiment of the present invention.

FIGURE 2 is a fragmentary elevation, partially in section, of one type of installation of the packing ring in FIGURE 1.

FIGURE 3 is a transverse section, taken along the line 3—3 in FIGURE 2, and showing the central member in the construction being sealed by the packing used where the packing takes a split construction.

FIGURE 4 is an enlarged, fragmentary elevation, principally in section, of machinery which includes packing of the present invention in a V-packing construction.

FIGURE 5 is a top plan in reduced scale of the V-packing of FIGURE 4, with layers or rings thereof cut away to show the slit interruptions in the several packing rings used in the V-packing.

FIGURE 6 is an enlarged detail of the cross-section of the packing ring in FIGURE 1. FIGURE 6 as well as all of the remaining figures do not include section lines since such might otherwise obscure the true nature of the configuration shown; however, it will be understood that FIGURE 6 and the remaining figures are all representative transverse sections of various packings which may be used.

FIGURE 7 illustrates another type of section which the packing ring of the present invention may take; the section shown in FIGURE 7 is similar to that shown in FIGURE 6 except for the upper surfaces of the packing ring-member, hereinafter described.

FIGURE 8A is an exploded view of a section of one type of packing ring wherein the O-ring employed is used as spring-loading to thrust outwardly the lips of the O-ring member to effect the seal.

FIGURE 8B is a transverse section of the composite ring of FIGURE 8A when the construction of the latter is assembled and installed as a piston ring.

FIGURE 9A is an exploded view of the transverse section of another type of ring wherein the nominal contour of the packing ring-member is made such that the width of the top thereof is greater than the space which is to be sealed.

FIGURE 9B is a transverse section of the structure of FIGURE 9A when the structure of the latter is assembled.

FIGURE 10 illustrates the construction of a packing ring-member, substantially identical to that shown in FIGURES 9A and 9B wherein the same is configured so as to be used either as a U-cup or as part of a composite ring structure.

FIGURE 11 is a fragmentary view, principally in action as before mentioned, of the packing ring of FIGURE 10 installed in one type of structural context.

In FIGURE 1 the packing ring 10 of the invention is shown to comprise a packing ring-member 11 and an O-ring 12. The O-ring 12 will generally be of circular cross-section as indicated at A. However, variations from circular cross-section, such as elliptical cross-sections, for example, may be used if desired for special purposes.

Packing ring-member 11 includes an upper annular recessed area 13 which is preferably undercut as shown such that packing ring-member 11 encompasses the O-ring 12 in a degree greater than 180° relative to the transverse periphery of the O-ring.

The recessed area 13 may be considered to be delineated by upper bifurcated portion 14 of O-ring 12. Upper bifurcated portion 14 is contiguous with base portion 15 of principal member 11. The principal member 11, in addition to including the upper bifurcated portion 14 and base portion 15, is also preferably provided with a lower edge groove 16. When such an edge groove is supplied, then the packing ring not only may be used without O-ring 12 simply as a U-cup as shown in FIGURES 10 and 11, hereinafter described, but also in a stacked configuration, in combination with a respective O-ring as shown in FIGURE 1, such that the packing in stacked configuration are obtained as shown in FIGURE 4. Suggested dimensions and position of edge groove 16 will be considered hereinafter.

At this juncture it is important to note that the upper bifurcated portion 14 is flared outwardly relative to base portion 15. This flaring out may be due either to the nominal configuration of the upper bifurcated portion 14 when O-ring 12 is not inserted in cavity 13, or, and preferably, the flare may be produced upon the insertion of O-ring 12 into area 13 such that upper bifurcated portion 14, in effect, is spring-loaded by the insertion of O-ring 12 and by its resilience, the resilience of packing ring-member 11, or both. This will be more fully explained in connection with FIGURES 8A–8B and 9A–9B.

Optionally included in the design of the packing ring of FIGURE 1 are slit interruptions 17 and 18, mutually displaced with respect to each other, which are provided in the design of packing ring-member 11 and O-ring 12, respectively. Where the packing ring-member 11 and O-ring 12 are manufactured from rubber or other elastomer, or plastic substances such as that going under the name Teflon, then such slits provide for easy installation thereof over a shaft or other central member. Such packing ring need not be slipped over the end of the shaft but rather may be inserted medially with respect thereto. This accommodates packing ring installation as a piston ring or in a cylinder bore seat, for example, without necessitating the removal of other parts, having outside diameters larger than the inside diameter of the packing, in order that the packing can be placed.

FIGURES 2 and 3 illustrate the use of packing ring 10 in FIGURE 1 in one context of the invention. Central member 19 such as a piston or shaft is disposed within bore 20 of cylinder 21, for example, and means such as packing retainer ring 22, bolts 23 and mounting ears 24 are provided so that the packing retainer ring may be drawn up to seat firmly the packing ring 10. In such a representative construction, the ears 24 are provided the ring 22 and include apertures 25 for receiving bolts 23. Apertures 26 are included in retainer ring 22 to receive the bolts 23. Tightening down of these bolts will produce the upward movement of retainer ring 22 and the resulting seating and desired securement of packing ring 10. More particularly in this regard, the inner surface S of cylinder 21 will press downwardly upon O-ring 13 which, if resilient, will produce an essentially hydrostatic pressure area about area 13 to urge the bifurcated portion 14 to expand, thereby increasing the interference and resultant sealing at the packing. In a preferred embodiment of the invention, where an O-ring is used, the upper bifurcated portion will terminate short of the upper surface of O-ring 12. Rubber and other rubber-like polymers have the characteristic of being hydrostatic in nature, that is, deformable and yet occupying the same volume for every deformation of configuration. Where an O-ring is made of such a material, therefore, the distortion of the O-ring, as produced by a downward pressure of retainer-ring 22 thereupon, will cause the O-ring to "expand" within area 13 so as to spread outwardly the bifurcated portion, thereby increasing the nominal width of the latter. This effect insures good sealing characteristics. It must be remembered, however, that the hydrostatic spring-loading effected by the insertion of O-ring 12, as shown in FIGURES 1 and 2, is not dependent upon any tightening down of flange ring 22. Rather, the O-ring construction may simply be placed in a groove either in the central member or at the outer member including the bore so that the pre-load on the packing as contributed solely by the O-ring will be sufficient to provide a satisfactory seal for most purposes. Further, this seal will be enhanced by the fluid pressure of machine employing the seal as in the case of fluid pumps, pneumatic compressors, and so forth.

FIGURE 3 illustrates the packer ring of FIGURE 2 wherein the same, as shown also in FIGURES 1 and 2, include slit interruptions 17 and 18 in the packing ring member 11 and O-ring 12, respectively. Though such slit interruptions may not be necessary for certain applications, they are advantageous in installing the rings where, as before mentioned, it is difficult to slip a non-slit ring over the shaft or other central member for mounting purposes.

It will be noted particularly with reference to FIGURE 1 that the slit interruptions 17 and 18 are preferably disposed in planes which are angulatively aligned with respect to transverse axis A′ of the packing ring, for in this manner the seal is most effective. It will be noted that in those instances where the recess area 13 and the O-ring 12 are mutually constructed and so arranged such that the O-ring 12 is snapped into the packing ring-member 11, then the O-ring, in addition to completing the packing ring seal, serves to hold rigid the packing ring seal as an assembly technique immediately prior to or at placement of the packing ring.

As before mentioned, the packing ring 10 will be disposed in a cavity of annular character, designated 27 in the drawings, see FIGURE 2. This cavity may take any of several forms about central member 19. The cavity 27 may be formed by the groove or recess of the central member, by a groove or recess in the cylinder as shown in FIGURE 2, or by a combination of both, this plus the clearance between cylinder 21, for example, and central member 19. See clearance space 28 in FIGURE 2. Throughout it will be understood that the annular cavity is the cavity provided for the packing ring, howsoever the cavity may be delineated. Whatever structure is used, it should be understood throughout that the width of the cavity will be defined by use of the structure supplying such width, which width is determinative in providing the necessary interference or sealing effect for the composite packing ring which is designed nominally slightly oversize with respect to cavity width W.

FIGURE 4 illustrates a condition wherein several of the packing rings 10 of FIGURE 1 are included in cylinder 24 to provide a seal in cavity 27′, similar to cavity 27 in FIGURE 2. It will be noted that the cinching down of bolt 23 will draw retainer ring 22′ (substantially identical to ring 22 in FIGURE 2) upwardly so as to compress the stacked packing rings together. This forms what is known as a V-packing, howbeit the configurement of the individual packing rings and their cooperation are somewhat different from that known in the V-packing art. It will be noted with reference to FIGURE 4 that no positive or negative (male or female) adapters need be used as is the case with conventional V-packings. The upward protrusion of each of the O-rings 12 from their respective packing ring-members 11 accommodates a direct stacked seating of the individual rings since the O-rings are nested in edge groove 16 of the respective packing ring disposed thereabouts. Thus, the drawing up of bolt 23 so as to compress the V-packing will add to the hydrostatic type loading by the O-ring 12 of packing ring-member 11 so as to produce a spreading out of each of the bifurcated portions 14; also, as in the case shown in FIGURE 4, there will also be a spreading due to the downward pressure of the corner areas of base portion 15 upon the upwardly angulated lips 14′ and 14″ of the bifurcated portion so as to further contribute to the sealing effect. It is important to note that such hydraulic or pneumatic pressure as may be present at the sealed area will contribute to the sealing effect by contributing to the deformation of the respective O-ring and by further adding to the hydrostatic pressure action thereof in spreading the bifurcated portion of the respective packing ring-member. Such lubricant pressure is indicated by the arrow P′ in FIGURE 4.

FIGURE 5 illustrates that the slit interruptions 17 and 18 of the stacked packing rings in FIGURE 4 will preferably be displaced in order to minimize if not completely eliminate any tendency whatever of the packing to leak at its seal. Such slit interruptions can accommodate the placement of the packing rings about pistons and piston rods and other types of central members as was heretofore explained in the case of FIGURES 1 and 2.

FIGURE 6 is an enlarged transverse section of the packing ring 10 of the present invention. The packing ring-member 11 and the O-ring 12, being illustrated in enlarged section, are detailed so that the dimensions and angles involved in a preferred embodiment of the invention may be perceived. In FIGURE 6 the O-ring 12 is shown to have a circular cross-section. While some deviation from this is possible, it is preferred for sake of manufacturing cost and sealing quality that a standard O-ring be used as shown. It is recommended that the angles $\theta$ and $\phi$ are of the order of 10° and 3°, respectively. Of the two angles the angle $\theta$ is the most variable and, in fact, may be flat or even a negative angle that is shown by the new angle designated $a$ in FIGURE 7. In sum, the character of the upper surface S' of packing ring-member 11, whether this surface be beveled or flat, will depend upon the particular application involved. Base portion 15 may be considered as terminating at a dimension C above the baseline BL of the packing ring-member. Thereabove the upper bifurcated portion 14 is shown to be contiguous therewith and to flare outwardly at a suggested angle of the order of 3° (angle $\phi$). This angle may also vary somewhat, this depending upon the application involved. It is esential, however, that base portion 15 be slightly undersize relative to the width W of the cavity involved, to facilitate placement. See FIGURE 2. Merely by way of example, the clearance F on both sides of base portion 15 may each be of the order of .008 inch. Upper bifurcated portion 14, however, will flare outwardly so that, preferably, an interference of the order of four percent exists between the packing ring-member 11 and the structure enclosing the same. Thus, a hypothetical area having a diameter equal to the outside diameter of the cavity of width W times 1.04 should be approximately equal to a hypothetical area having a diameter equivalent to the diameter of packing ring-member 11 at its upper extremity of upper bifurcated portion 14. FIGURE 6 indicates the nominal dimensions of the packing ring 10 prior to compression. The oversized nature of the flared or upper bifurcated portion 14 is for the purpose of sealing and the undersized nature of the O-ring at its base is to permit easy installation of the packing ring in certain applications.

The dimensions R' are preferably equivalent and will be of the order of .032 inch. It is noted that these dimensions should be the same since, thereby, substantially congruous stacking of the packing rings for V-packings may be effected. W in FIGURE 6, of course, designates the width of the channel of the annular cavity 27' (or 27 in FIGURE 2).

Another type of packing ring is illustrated in FIGURE 7, simply in section form. The packing ring of FIGURE 7 is similar to that shown in FIGURE 6 with the exception of the compound surfaces S'' associated with upper bifurcated portion 14' (similar to bifurcated portion 14 in FIGURE 6). However, it is desirous for optimum sealing effect that the dimension R' between the uppermost part, this time at X, of packing ring-member 11' and the top of O-ring 12 be preserved.

When the O-ring and packing ring-member are compositely used as the sealing means, then the important feature of the invention is that packing ring be, in effect, "spring-loaded" by the O-ring to achieve the interference and hence the sealing effect desired. Where the packing ring-member is resilient, or at least outwardly deformable as in FIGURE 8A, then the O-ring 12 may be made oversize with respect to recessed area 13, so that upon the insertion of O-ring 12 in recessed area 13, as shown in FIGURE 8B, the upper bifurcated portion 14 will expand outwardly as seen to provide the seal as a piston ring for piston P working in cylinder CY. In this connection it will be noted that the O-ring in this connection need not be resilient, although such resiliency will be preferred.

In FIGURES 9A and 9B is shown an alternate O-ring and packing ring-member construction wherein the O-ring 12' is the same size, relative to curvature, as that of annular recessed area 13. Thus, where either the O-ring 12' or the packing ring-member 11' in FIGURES 9A and 9B is resilient, there will be a spring loading outwardly of the sealing means. It will be noted that the normal size of packing ring-member 11' is already the size of the intended width W plus a desired increment for sealing so that while the O-ring does not expand the outer member outwardly, it does provide a spring backing in effect, for the packing ring-member.

FIGURE 10 illustrates a cross-section of a representative packing ring-member wherein no O-ring is used and, hence, wherein the same is used as a U-cup, so called in the trade. It is to be noted that the cross-sectional girth of the bifurcated portion 14' in FIGURE 10 is greater than width W of the cavity. A FIGURE 10 configuration will attain where the resiliency in character of the material is such that a U-cup only will suffice for the sealing desired. FIGURE 11 simply indicates the U-cup of FIGURE 10 being disposed in structure to seal the same, being compressed by the boundaries of the width W to provide the seal desired.

As to the material of which the packing ring, that is the packing ring-member and/or O-ring is comprised, it is recommended that a rubber or rubber-type polymer be used which has a 15 to 90 durometer reading on the Shore A durometer scale. The durometer of the material chosen will be such that the desired sealing effect can be satisfactorily obtained. The packing ring-member conceivably can be metal and in some instances will be plastic such as that going under the trade name Teflon. Where the packing ring-member is sufficiently resilient, then the O-ring can have a quite high durometer reading and conceivably could be metal. But for a highly preferred embodiment in the invention a suitable rubber or rubber-like polymer will be used for both the packing ring-member and the O-rings. It should be noted that the sealing qualities of the ring are not dependent upon structural force being exerted upon the O-ring, since the O-ring itself "spring-loads" the packing ring assembly to provide the sealing required. Hence, there need be no precise fit requirements met in order for the sealing properties of the packing ring to remain since the packing ring per se includes sufficient spring loading, by virtue of the inclusion of the O-ring, to provide sufficient outward force upon the upper bifurcated portion of the packing ring-member to acomplish the sealing function. This will further be aided by such hydraulic or pneumatic pressure as will be present. Of course, for certain applications the structure of the machinery at the packing ring seal can be tightened down as heretofore indicated so as to further increase the quality of the sealing function.

The term O-ring used herein shall be understood to include not only "O-rings" which are presently used in the industry as seals but also O-configured rings which are obtained by cutting segments of desired length from extruded stock and shaping such segments in the form of O's preparatory to the seating thereof.

Another type of material which may be used for fabrication of the packing ring-member 11 and O-ring 12 (also 11' and 12') in the various contexts shown (in addition to the ones heretofore enumerated as examples), is the composition of matter described in the inventor's co-pending patent application filed March 1, 1963, Serial No. 262,183, and titled "Composition of Matter Suitable for Machinery Packings and the Like," wherein a polyurethane base having certain additives is fully described.

In the FIGURES 2 and 4 illustrations it will be realized that for vacuum contexts as in the case of vacuum pumps the seals may be disposed upside-down so that outside air pressure will be exerted against the upper bifurcated portion of the outermost packing ring.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In machinery including a bore and a central member disposed within said bore and spaced therefrom to define an annular cavity of a transverse cross-section width W about a central member, a resilient packing-ring disposed in said cavity, said packing-ring comprising a packing-ring member including an upper surface and having a cross-section comprising a base portion of width less than W and an upper, deformable, bifurcated portion constructed to delineate an annular recessed area of undercut character which is contiguous with and medially depends from said upper surface and which is conformable to an O-ring snap-seated therein, and an O-ring snap-seated in said annular recessed area, said recessed area conforming to said O-ring snap-seated therein, and said O-ring protruding above said upper surface, said bifurcated portion with said O-ring seated in said annular recessed area being of nominal width greater than W, said packing-ring being compressed width-wise along said bifurcated portion of its said cross-section through the constrainment thereof by boundaries of said cavity defining width W, and wherein each of said packing-ring and O-ring is provided with a respective slit interruption, said slit interruptions being mutually displaced.

2. In machinery including a bore and a central member disposed within said bore and spaced therefrom to define an annular cavity of transverse cross-sectional W about a central member; plural, mutually adjacent, stacked resilient packing-rings disposed in said cavity, each of said packing-rings comprising a packing-ring member including an upper surface and having a cross-section comprising a base portion of width less than W and an upper deformable bifurcated portion constructed to delineate an annular recessed area of undercut character which is contiguous with and medially depends from said upper surface and which is conformable to an O-ring snap-seated therein, and an O-ring snap-seated in said annular recessed area, said recessed area conforming to said O-ring snap-seated therein, said bifurcated portion with said O-ring seated in said annular recessed area being of width greater than W, said packing-ring being compressed width-wise along said bifurcated portion of its said cross-section through the constrainment thereof by boundaries of said cavity defining width W, and wherein each of said packing-ring members includes an edge groove receiving a respective O-ring of the packing-ring disposed immediately therebelow, each of said O-rings protruding above said upper surface of a respective packing-ring member.

3. In machinery including a bore and a central member disposed within said bore and spaced therefrom to define an annular cavity of a transverse cross-section width W about a central member, a resilient packing-ring disposed in said cavity, said packing-ring comprising a packing-ring member including an upper surface and having a cross-section comprising a base portion of width less than W and an upper, deformable, bifurcated portion constructed to delineate an annular recessed area of undercut character which is contiguous with and medially depends from said upper surface and which is conformable to an O-ring snap-seated therein, and an O-ring snap-seated in said annular recessed area, said recessed area conforming to said O-ring snap-seated therein, and an O-ring protruding above said upper surface, said bifurcated portion with said O-ring seated in said annular recessed area being of nominal width greater than W, said packing-ring being compressed width-wise along said bifurcated portion of its said cross-section through the constrainment thereof by boundaries of said cavity defining width W.

References Cited by the Examiner
UNITED STATES PATENTS

| 2,706,655 | 4/55 | Showalter | 277—124 |
| 2,845,286 | 7/58 | Case et al. | 277—105 |
| 2,934,368 | 4/60 | Adamson | 277—153 |
| 3,100,648 | 8/63 | Lee et al. | 277—163 XR |

FOREIGN PATENTS 1,231,867  4/60  France.

EDWARD V. BENHAM, *Primary Examiner.*

SAMUEL ROTHBERG, *Examiner.*